United States Patent
Roberts et al.

(10) Patent No.: US 6,810,380 B1
(45) Date of Patent: Oct. 26, 2004

(54) PERSONAL SAFETY ENHANCEMENT FOR COMMUNICATION DEVICES

(75) Inventors: Linda Ann Roberts, Decatur, GA (US); Edward Michael Silver, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 476 days.

(21) Appl. No.: 09/818,858

(22) Filed: Mar. 28, 2001

(51) Int. Cl.[7] .................. G10L 15/22; H04M 11/04
(52) U.S. Cl. .................. 704/270; 704/274; 340/539.13; 379/45; 455/404.2
(58) Field of Search .................. 704/270, 270.1, 704/273, 275, 246, 251, 274; 340/539.1, 539.11, 539.13; 379/45; 455/404.1, 404.2, 512

(56) References Cited

U.S. PATENT DOCUMENTS

| | | |
|---|---|---|
| 5,042,063 A | 8/1991 | Sakanishi et al. |
| 5,045,839 A | 9/1991 | Ellis et al. |
| 5,165,095 A | 11/1992 | Borcherding |
| 5,373,125 A | 12/1994 | Ford et al. |
| 5,452,340 A | 9/1995 | Engelbeck |
| 5,499,288 A | 3/1996 | Hunt et al. |
| 5,663,734 A | 9/1997 | Krasner |
| 5,717,201 A | 2/1998 | Lin et al. |
| 5,742,666 A | 4/1998 | Alpert |
| 5,826,199 A | 10/1998 | Maeda |
| 5,991,364 A | 11/1999 | McAllister et al. |
| 6,009,383 A | 12/1999 | Mony |
| 6,018,568 A | 1/2000 | Furman et al. |
| 6,175,308 B1 * | 1/2001 | Tallman et al. .......... 340/539.11 |
| 6,263,311 B1 * | 7/2001 | Dildy .......................... 704/273 |
| 6,496,111 B1 * | 12/2002 | Hosack ....................... 340/540 |
| 6,501,420 B2 * | 12/2002 | Townsend et al. ........ 342/357.1 |
| 6,510,315 B1 * | 1/2003 | Arnson ..................... 455/404.1 |
| 6,600,914 B2 * | 7/2003 | Uhlik et al. ............... 455/512 |
| 6,711,399 B1 * | 3/2004 | Granier .................... 455/404.1 |
| 6,721,632 B2 * | 4/2004 | Fallenstein .................... 701/1 |
| 6,732,077 B1 * | 5/2004 | Gilbert et al. ............. 704/270 |
| 6,740,075 B2 * | 5/2004 | Lebel et al. ............. 604/891.1 |
| 6,748,052 B2 * | 6/2004 | Zellner et al. ................ 379/45 |

* cited by examiner

Primary Examiner—Richemond Dorvil
Assistant Examiner—Martin Lerner
(74) Attorney, Agent, or Firm—Cantor Colburn LLP

(57) ABSTRACT

The present invention is a system and method for providing personal safety enhancement for communication devices having a speech recognition module. In one embodiment, when a specific speech segment recognized by the speech recognition module is received by a communication device of the present invention, the communication device performs the following tasks: (1) establishing a communication session with the called party; (2) communicating with a location system to generate location information pinpointing the location of the communication device; and (3) providing the location information to the called party. In other embodiments, the communication device performs additional tasks, including for example: (4) detecting a triggering event during the communication session; (5) communicating with the location system to generate subsequent location information; and (6) providing one or more of the subsequent location information and the triggering event to the called party. The called party may then use the location information and the triggering event to perform one or more actions, including providing help to the user of the communication device. The communication device is a wireless device in preferred embodiments of the present invention.

19 Claims, 4 Drawing Sheets

PERSONAL SAFETY ENHANCEMENT FOR COMMUNICATION DEVICES

BACKGROUND

1. Field of the Invention

The present invention relates to telecommunications, and more particularly, to a system and method for providing personal safety enhancement for telecommunication.

2. Background of the Invention

The widespread use of the wireless telephones in the United States has prompted the Federal Communications Commission (FCC) to promulgate new rules related to emergency call processing. The FCC's wireless Enhanced 911 (E911) rules require certain Commercial Mobile Radio Services (CMRS) carriers to begin transmission of enhanced location and identity information in two phases. The first phase, started on Apr. 1, 1998, required wireless service providers to transmit a 911 caller's number and section of the cell site from which the call is originated to a Public Safety Answering Point (PSAP). The second phase, starting on Oct. 31, 2001, requires all wireless service providers to locate two-thirds of all 911 callers within 125 meters of their physical locations. In other words, for all 911 calls received, a PSAP must be able to pinpoint 67% of the callers within 125 meters.

Under the FCC rules, wireless communication networks and wireless telephones (or any wireless devices that can be used to call 911), must provide both the identity and location of the caller to a 911 dispatcher. To provide a caller's identity, the wireless device must furnish a device identification, e.g., a mobile identification number (MIN), indicating in most instances the telephone number of the device. To provide a caller's location, the wireless communication networks and wireless devices will use a network-based location system or a handheld location system installed within the wireless devices, or a combination of the two systems. An example of a handheld location system is a Global Positioning System (GPS) receiver. U.S. Pat. No. 5,663,734, which is incorporated herein by reference, discloses a GPS receiver and a method for processing GPS signals.

The contemplated E911 location technology will enable the PSAP to know the location of the wireless telephone at the time the 911 call is established. However, the caller must still physically dial the number. The current technology does not provide a wireless device that can be used to report an emergency situation, without requiring the user to actually dial the number or press at least one key on a keypad of the wireless device. No existing wireless device can dial 911 automatically when its user is in an emergency situation.

SUMMARY OF THE INVENTION

The present invention enables an emergency situation to be reported to a called party automatically when a recognizable speech segment is received by a communication device of the present invention. The present invention leads to increased safety for members of the community.

The following scenario provides a specific example of how a preferred embodiment of the present invention may be implemented. While in the parking lot of a university campus one evening, a young student is attacked by a criminal. As she is being attacked, she says or yells, "HELP". Since her wireless telephone had been previously programmed to recognize her voice saying or yelling "HELP", the wireless telephone automatically dials the number 911 and establishes a wireless communication session with a PSAP. A location system associated with the wireless telephone then generates location information pinpointing the location of the wireless telephone. The location information is provided to the PSAP. At the PSAP, a trained 911 operator can listen for clues to determine whether one or more of the police, paramedics, and fire fighters should be dispatched. Using the present invention, an emergency response unit can assist the student sooner than if the student was required to dial 911 herself, assuming she remembered or had the opportunity to dial that number.

The preferred embodiment of the present invention is a wireless device. The wireless device may be any apparatus with telecommunication and E911 capabilities. For example, the wireless device may be a wireless telephone, an interactive pager, a handheld computer, or a personal digital assistant. As it would be apparent to one ordinarily skilled in the art, the present invention can be adapted to operate on non-wireless communication devices, such as a wireline telephone.

A wireless device of a first preferred embodiment of the present invention comprises a microprocessor, a speech recognition module, a location system, a microphone, and a memory. A second preferred embodiment of the present invention comprises additional features, including an orientation detector.

A preferred method for using the present invention comprises the following steps. First, a relationship between a telephone number (the called number) associated with a called party and a speech segment is created and stored in the memory of the wireless device. The speech segment is preferably spoken by a person who carries and uses the wireless device on a regular basis. The speech segment may also be non-speaker-specific. Second, when the wireless device receives the speech segment, it retrieves the called number and establishes a communication session with the called party. Third, a location system associated with the wireless device generates location information pinpointing the location of the wireless device and provides the location information to the called party. The location system can be an integral part of the wireless device or a network based component. Fourth, the called party can use the location information to perform an action. The action may be, for example, dispatching an emergency response unit to the location pinpointed by the location information.

Accordingly, it is an object of the present invention to provide a method for reporting an emergency situation to a called party without requiring the calling party to actually dial the called party's number.

It is another object of the present invention to provide prompt response to a user of the present invention without requiring the user to dial any number.

It is another object of the present invention to enable spontaneous transmission of location information to a called party when a user of the present invention is in distress.

These and other objects of the present invention are described in greater detail in the detailed description of the invention, the appended drawings, and the attached claims.

DETAILED DESCRIPTION OF PREFERRED EMBODIMENTS

Figure 1:
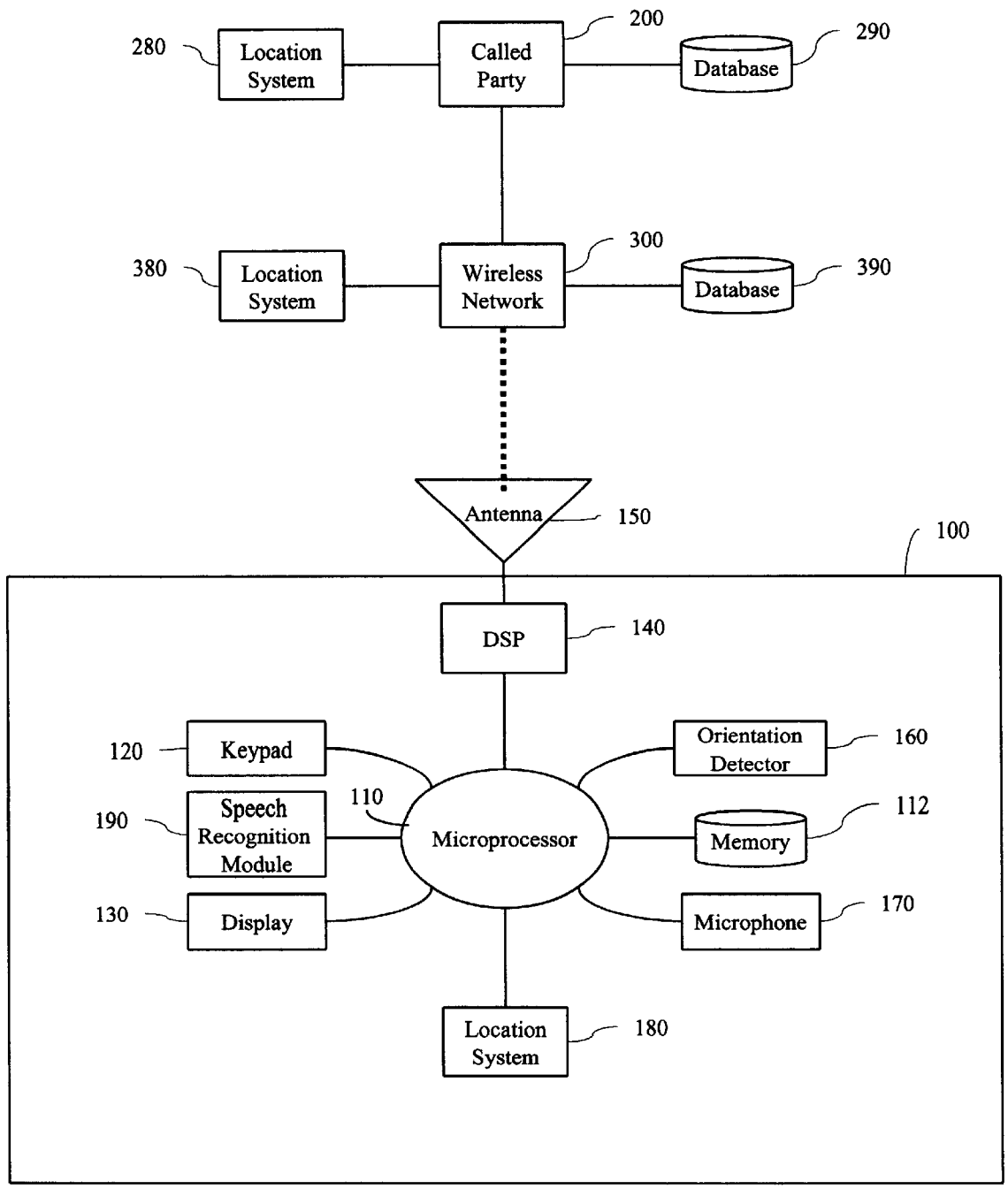
FIG. 1 is a schematic diagram showing the system architecture of an embodiment of the present invention.

FIG. 1 is a schematic diagram showing the system architecture of an embodiment of the present invention. Wireless device 100 may be any wireless communication equipment that can be used to establish a wireless communication session with a called party, such as called party 200. Examples of wireless device 100 include a wireless telephone, an interactive pager, a handheld computer, and a personal digital assistant. Wireless device 100 comprises, among other components, one or more of microprocessor 110, memory 112, keypad 120, display 130, digital signal processor (DSP) 140, antenna 150, orientation detector 160, microphone 170, location system 180, and speech recognition module 190. Microprocessor 110 is preferably a RISC (reduced instruction set computer) microprocessor. Memory 112, keypad 120, display 130, DSP 140, antenna 150, and microphone 170 are common components that are typically found on a wireless telephone.

Orientation detector 160 can sense the orientation of wireless device 100. For example, orientation detector 160 can determine whether wireless device 100 is in an upright position, a horizontal position, or a tilted position. U.S. Pat. No. 5,373,125, which is incorporated herein by reference in its entirety, discloses a switch assembly that may be adapted as orientation detector 160. Other tilt switches, such as those utilizing mercury or other conductive substances, may be adapted for use as orientation detector 160. In addition, the system disclosed in U.S. Pat. No. 5,045,839, which is herein incorporated by reference in its entirety, may be adapted for use as orientation detector 160.

Speech recognition module 190 can use one of several known voice recognition technologies. For example, the technologies disclosed in U.S. Pat. Nos. 5,042,063, 5,165, 095, 5,452,340, 5,499,288, 5,826,199, 5,991,364, 6,009,383, and 6,018,568, which or modified are herein incorporated by reference in their entirety, may be incorporated or modified to implement the present invention.

Location system 180 generates location information pinpointing the location of wireless device 100. Location system 180 may be a Global Positioning System (GPS) receiver that is in communication with a constellation of GPS satellites, which produces position coordinates of wireless device 100. U.S. Pat. No. 5,663,734, which is incorporated herein by reference, discloses a GPS receiver and a method for processing GPS signals.

Wireless device 100 can establish a wireless communication session with called party 200 through wireless network 300. In lieu of or in addition to location system 180, the present invention can comprise one or more of location system 280 and location system 380, which are associated with called party 200 and wireless network 300, respectively. Preferably, memory 112, database 290, and database 390 comprise information related to wireless device 100, including its serial number, its MIN, the name of the person owning it, the list of people who are most likely using it, etc. If called party 200 is a PSAP, database 290 can be a 911 database.

Location systems 180, 280, and 380 can generate the location information using one of several methods. For example, the method published by James J. Caffery, Jr. and Gordon L. Stüber in IEEE Communications Magazine (April 1998) may be used. The article is titled "Overview of Radiolocation in CDMA Cellular Systems", and is hereby incorporated by reference in its entirety.

Figure 2:
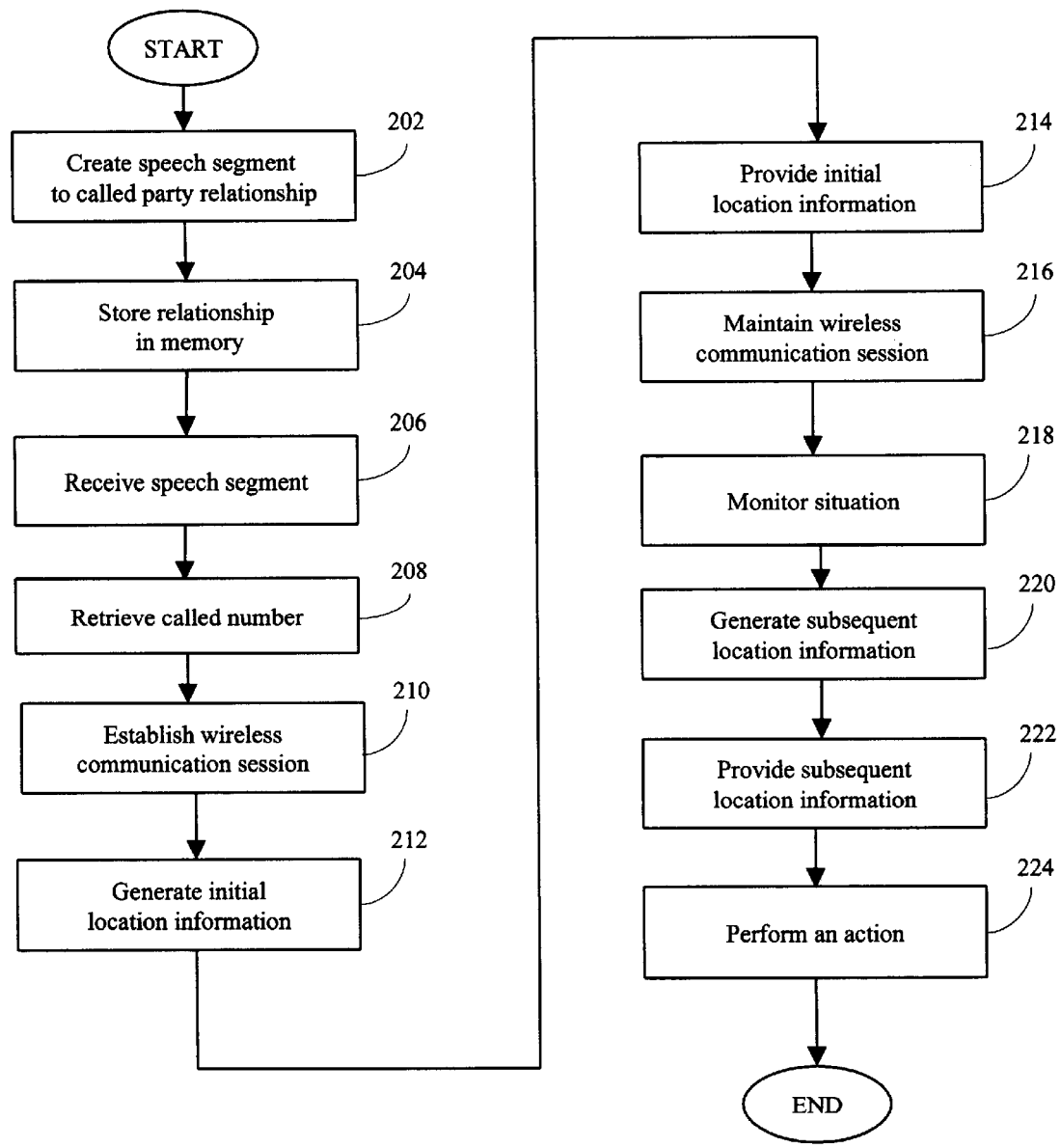
FIG. 2 is a flowchart showing the general steps involved in using an embodiment of the present invention.

FIG. 2 is a flowchart showing the general steps involved in using an embodiment of the present invention. In specific embodiments of the present invention, one or more of these general steps may be used. Furthermore, each of the general steps may include one or more sub-steps in the specific embodiments. Although these general steps and sub-steps are discussed herein sequentially, the steps may be implemented in any reasonable combination in any logical order to accomplish a specific purpose. Furthermore, specific embodiments of the present invention may include additional unique steps that are not discussed herein as part of the general steps.

In step 202, at least one relationship between a speech segment and a telephone number associated with called party 200 (the called number) can be defined or created. A first specific example of the speech segment may comprise the word "HELP". A second specific example of the speech segment may comprise the phrase "I NEED BACK UP". In still another specific example of the relationship, the speech segment may comprise a screaming voice of the user. As known to the one skilled in the art, wireless device 100 can be programmed with more than one relationship between various speech segments and different called numbers. Furthermore, the speech segments used may or may not be speaker-specific. In other words, wireless device 100 may be programmed to only recognize "HELP" if it is being spoken or yelled by a specific person, or may be programmed to recognized any person's speaking or yelling help.

In step 204, the relationship between the speech segment and the called number is stored in memory 112. One of several entities may store the relationship. For example, the user may press a certain key or sequence of keys on keypad 120, utter the speech segment into microphone 170, key in the called number on keypad 120, and verify the called number on display 130. Speech recognition module 190 can be used to implement this step. Step 204 may also be performed by the manufacturer of wireless device 100 or by wireless network 300. For example, non-speaker-specific speech segments such "CALL 911" may be programmed by someone other than the user to relate any person's "CALL 911" speech segment with the number 911.

Also, in step 204, information related to wireless device 100 can be stored in memory 112. The information may comprise a user profile. The user profile may comprise, for example, the name of the user of wireless device 100, the medical record of the user, the type of vehicle owned by the user, and/or the vehicle's license plate number. The information stored in memory 112 can be provided to called party 200 during a wireless communication session. The information in memory 112 may also be stored in a database accessible by called party 200. For example, the information may be stored in at least one of database 290 and database 390, both of which are accessible by called party 200.

In step 206, when a speech segment is created around wireless device 100, microphone 170 picks up the sound signal associated with the speech segment and provides it to microprocessor 110. Microprocessor 110 then, in step 208, determines whether the speech segment is one that which is associated with a called number. If so, microprocessor 110 retrieves the called number from memory 112. In a specific example, if the user speaks or says "HELP", microprocessor 110 knows that 911 is to be used as the called number.

In step 210, microprocessor 110 uses the called number retrieved in step 208 to establish a wireless communication session with called party 200. In the first specific example, microprocessor 110 dials the number 911 as the called number to call a PSAP (called party 200). The wireless communication session can be established using a number of components of wireless device 100, including DSP 140 and antenna 150. U.S. Pat. No. 5,742,666, which is incorporated herein by reference in its entirety, discloses a system and method for automatically dialing a stored telephone number.

In step 212, initial location information can be generated by at least one location system, which may be one or more of location systems 180, 280, and 380. The initial location information pinpoints the location of wireless device 100 at the time the initial location information is generated. The initial location information may be generated using any of the known methods discussed above. In step 214, the initial location information can be provided to called party 200 during the wireless communication session. The initial location information is preferably provided to called party 200 as soon as it is generated.

In step 216, the wireless communication session is maintained. Called party 200 preferably has exclusive control over the wireless communication session. Exclusive control means that only called party 200 can terminate the session. The exclusive control can prevent the wireless communication session from being terminated by anyone other than called party 200, whether accidentally or intentionally.

In step 218, called party 200 can monitor the situation. For example, microphone 170 of wireless device 100 can capture sound signals during the wireless communication. Specifically, called party 200 can listen to any noise or sound captured by microphone 170, which may provide further information about the situation involving the user.

In step 220, subsequent location information can be generated by one or more of location systems 180, 280, and 380. The subsequent location information can be generated based on a rule. The rule is preferably stored in one or more of memory 112, database 290, and database 390, to operate location system 180, location system 280, and location system 380, respectively. The rule may comprise generating the subsequent location information continuously. The rule may comprise generating the subsequent location information at regular intervals. The regular intervals may be every few seconds, minutes, or hours, depending on the specific application of the invention. The subsequent location information pinpoints a subsequent location of wireless device 100 at the time the subsequent location information is generated. The subsequent location information is preferably provided to called party 200, in step 222, as soon as it is generated in step 220.

In step 224, called party 200 can use one or more of the user profile, the initial location information, the subsequent location information, and any information it has to perform an action. The action may comprise, for example, dispatching an emergency response team to the location. Other actions can be performed as appropriate.

There are a number of specific embodiments that may be implemented. For example, in a first specific embodiment, a crime victim can obtain help from an emergency response unit without remembering to ask for help. In a second specific embodiment, the wireless device can be used by a law enforcement agency to assist an agent in an operation. Other embodiments may also be implemented.

Figure 3:
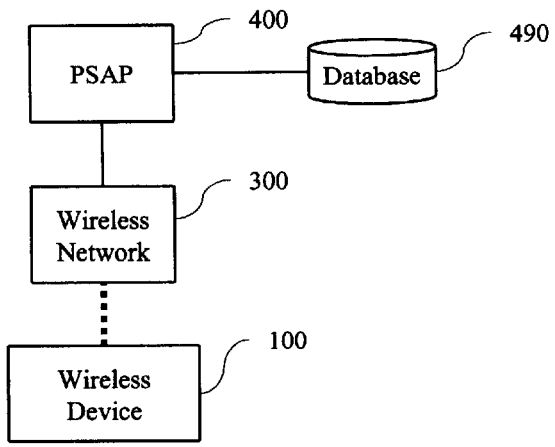
FIG. 3 is a schematic diagram showing the system architecture of a first preferred embodiment of the present invention, wherein a person can obtain help from an emergency response unit.

FIG. 3 is a schematic diagram showing the system architecture of a first preferred embodiment of the present invention. Database 490 is a database that is accessible by PSAP 400. Database 490 comprises, among other things, information of the kind typically maintained in a 911 database. A specific example involving a victim being attacked by a criminal is described herein to demonstrate how the present invention may be implemented. Wireless device 100 in this embodiment can be a wireless telephone, which is a node of wireless network 300.

Figure 4:
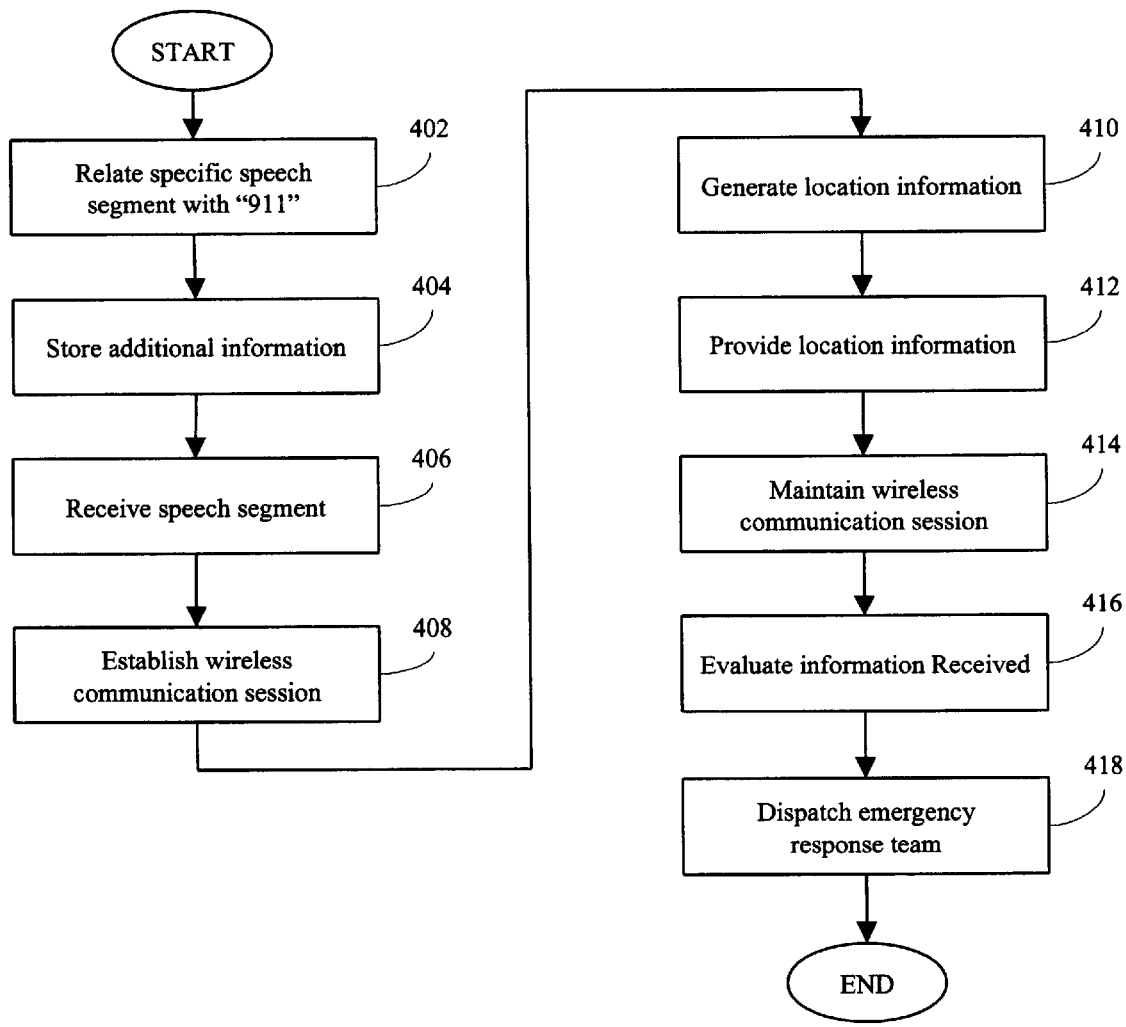
FIG. 4 is a flowchart showing the steps involved in using the first preferred embodiment of the present invention.

FIG. 4 is a flowchart showing the steps involved in using the first preferred embodiment of the present invention. In step 402, one or more specific speech segments can be related to "911" as the called number. For example, a specific speech segment might comprise a screaming voice of the user. A second specific segment may be the phrase "CALL 911" spoken or said by any person. In other words, the speech segment may or may not be speaker-specific. The relationship can be created and stored in memory 112 of wireless device 100 as described above.

In step 404, additional information related to the user of wireless device 100 can be stored in database 490. The information can comprise the identity of wireless device 100, the identity of the user of wireless device 100, as well as information related to the user's age, home address, vehicle, medical records, etc.

In step 406, when the user screams or when any person utters "CALL 911," wireless device 100 receives the speech segment. In step 408, wireless device 100 establishes a wireless communication session with PSAP 400. The wireless communication session can be initiated by microprocessor 110 dialing 911 because the speech segment is one that which has been stored in memory 112 to be related to 911. In step 410, location system 180 generates initial location system that pinpoints the location of wireless device 100. In step 412, the initial location information is preferably provided to PSAP 400 as soon as it is generated.

In step 414, the wireless communication session is maintained. Preferably, PSAP 400 has exclusive control over the wireless communication session. Exclusive control means that only PSAP 400 can terminate the session. During the communication session, PSAP 400 can receive additional information from wireless device 100. For example, PSAP 400 can listen to whatever noise or sound is captured by microphone 170 of wireless device 100. In step 416, PSAP 400 can evaluate the information received in the previous steps to perform an appropriate action, which can be performed in step 418. The action may be to dispatch police officers, paramedics, and/or firefighters as appropriate to assist the user of wireless device 100.

Figure 5:
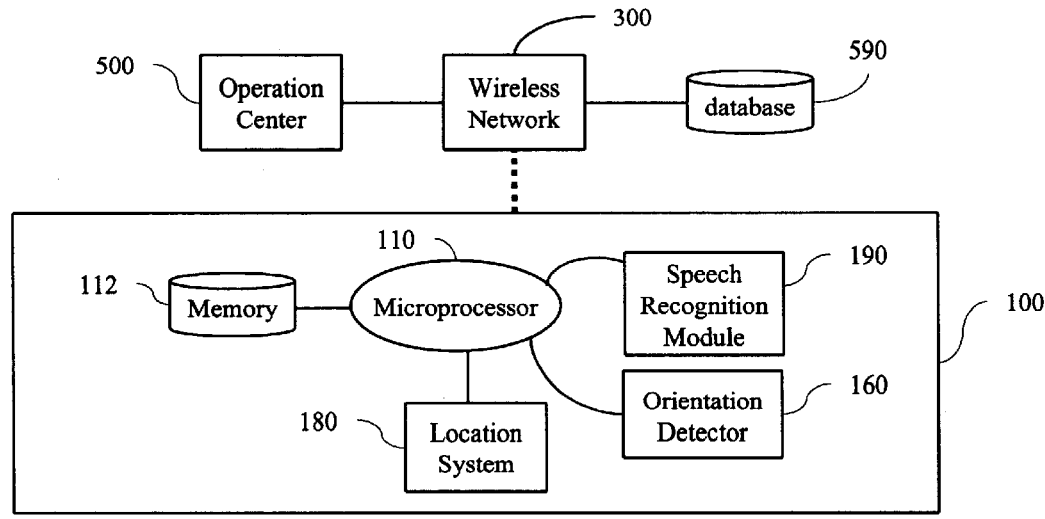
FIG. 5 is a schematic diagram showing the system architecture of a second preferred embodiment of the present invention, showing how the present invention can assist a law enforcement agent during an operation.

FIG. 5 is a schematic diagram showing the system architecture of a second preferred embodiment of the present invention, wherein the wireless device of the present invention can be used to assist a law enforcement agent during an operation. Operation center 500 is the called party in this embodiment. Wireless device 100 and operation center 500 are nodes of wireless network 300. Microprocessor 110, memory 112, orientation detector 160, and location system 180, among other components, are elements of wireless device 100. Orientation detector 160 may be any of several devices that can detect the orientation of wireless device 100. For example, orientation detector 160 may be a conventional tilt switch or the switch assembly disclosed in U.S. Pat. No. 5,373,125.

Database 590 is accessible by operation center 500. Database 590 comprises information related to wireless device 100. For example, database 590 comprises the name of the agent to whom wireless device 100 is assigned, as well as the work schedule of the agent.

Figure 6:
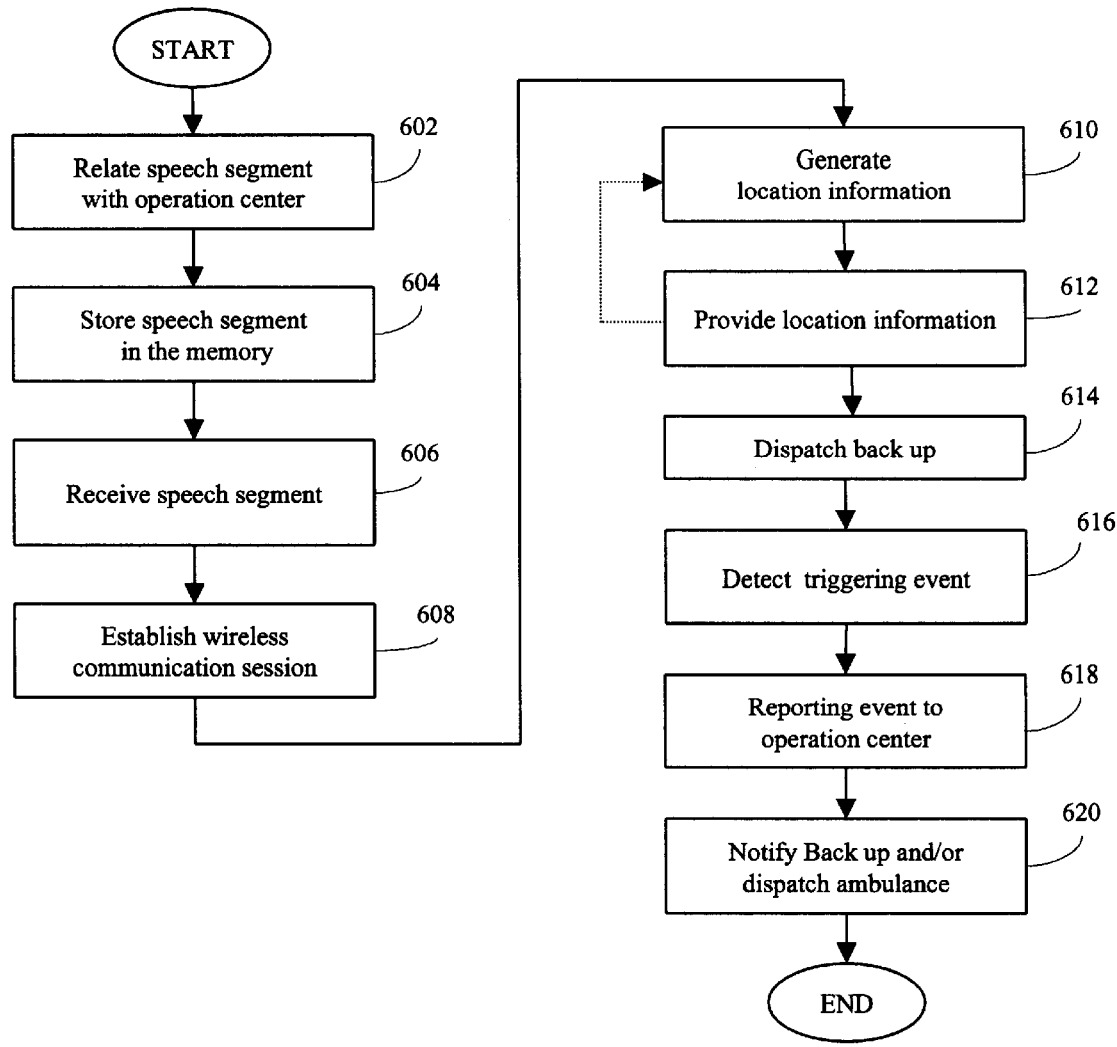
FIG. 6 is a flowchart showing the steps involved in using the second preferred embodiment of the present invention.

FIG. 6 is a flowchart showing the steps involved in using the second preferred embodiment of the present invention. In step 602, a speech segment is related to the telephone number of operation center 500. The specific speech segment may comprise, for example, the phrase "I NEED BACK UP". In step 604, the speech segment and the telephone number of operation center 500 can be stored in memory 112. In step 606, when the agent utters the phrase "I NEED BACK UP", the speech segment is captured by wireless device 100.

In step 608, wireless device 100 establishes a wireless communication session with operation center 500. In step 610, location system 180 generates location information pinpointing the location of wireless device 100. In step 612, the location information can be provided to operation center 500. Note that steps 610 and 612 can be repeated many times during the communication session to provide operation center 500 with subsequent location information to track the movement of wireless device 100 (which indicates the whereabouts of the agent).

In step 614, operation center dispatches back-up personnel as requested by the agent. In step 616, a triggering event may be detected by wireless device 100. The triggering event may involve a situation in which wireless device 100 had not been moving for a certain period of time. For example, the triggering event may occur when subsequent location information generated by location system 180 had not indicated any movement by wireless device 100 for more than 10 minutes, suggesting that the agent may have been injured. The triggering event may be one which is detected by orientation detector 160. For example, if the agent had been shot and had fallen, such that wireless device 100 lays in a position that is, for example, more than 60 degrees from vertical, orientation detector 160 would cause wireless device 100 to register that situation as the triggering event.

In step 618, the triggering event detected in step 616 is reported to operation center 500. In step 620, operation center 500 may perform an action. The action may be to alert the back-up personnel that the triggering event had occurred. The action may also comprise the dispatch of an ambulance to the location of wireless device 100 pinpointed by the latest location information.

The foregoing disclosure of embodiments and specific examples of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A communication device for reporting an emergency situation to a called party comprising:
   a speech recognition module in the communication device;
   a microprocessor in communication with the speech recognition module;
   a memory in communication with the microprocessor, wherein the memory comprises a user profile and a relationship between the speech segment and the called party; and
   a location system in communication with the microprocessor,
   wherein when a speech segment is recognized by the speech recognition module in the communication device, the microprocessor establishes a communication session with the called party, wherein the called party has exclusive control over the communication session; and
   wherein when the communication session is established, the location system generates location information and provides the location information to the called party.

2. The communication device of claim 1, wherein the user profile is received by the called party during the communication session.

3. The communication device of claim 1, wherein the communication device further comprises an orientation detector.

4. The communication device of claim 1, wherein the speech segment comprises one or more words.

5. The communication device of claim 1, wherein the location system generates subsequent location information, and wherein the subsequent location information is provided to the called party during the communication session.

6. The communication device of claim 1, wherein the speech segment is speaker-specific.

7. The communication device of claim 1, wherein the location system is a GPS receiver.

8. A communication device for reporting an emergency situation to a called party comprising:
   an orientation detector in the communication device;
   a speech recognition module in the communication device;
   a microprocessor in communication with the speech recognition module; and
   a location system in communication with the microprocessor,
   wherein when a speech segment is recognized by the speech recognition module in the communication device, the microprocessor establishes a communication session with the called party, wherein the called party has exclusive control over the communication session; and
   wherein when the communication session is established, the location system generates location information and provides the location information to the called party.

9. The communication device of claim 8, further comprising a memory, wherein the memory comprises the relationship between the speech segment and the called party.

10. The communication device of claim 9, wherein the memory comprises a user profile.

11. The communication device of claim 10, wherein the user profile is received by the called party during the communication session.

12. The communication device of claim 8, wherein the speech segment comprises one or more words.

13. The communication device of claim 8, wherein the location system generates subsequent location information, and wherein the subsequent location information is provided to the called party during the communication session.

14. The communication device of claim 8, wherein the speech segment is speaker-specific.

15. The communication device of claim 8, wherein the location system is a GPS receiver.

16. A communication device for reporting an emergency situation to a called party comprising:

an orientation detector in the communication device;

a speech recognition module in the communication device;

a microprocessor in communication with the speech recognition module;

a memory in communication with the microprocessor, wherein the memory comprises a user profile and a relationship between the speech segment and the called party; and a location system in communication with the microprocessor, wherein when a speech segment is recognized by the speech recognition module in the communication device, the microprocessor establishes a communication session with the called party; and wherein when the communication session is established, the location system generates location information and provides the location information to the called party, wherein the called party has exclusive control over the communication session.

17. The communication device of claim 16, wherein the user profile is received by the called party during the communication session.

18. The communication device of claim 16, wherein the location system generates subsequent location information, and wherein the subsequent location information is provided to the called party during the communication session.

19. The communication device of claim 16, wherein the location system is a GPS receiver.

* * * * *